(12) United States Patent
Gravningsbraten et al.

(10) Patent No.: US 12,447,572 B2
(45) Date of Patent: Oct. 21, 2025

(54) SYSTEM, METHOD AND COMPUTER PROGRAM PRODUCT FOR DECREASING THE RISK OF ERRONEOUSLY HANDLING OF A TOOL IN A MACHINE OPERATION

(71) Applicant: SECO TOOLS AB, Fagersta (SE)

(72) Inventors: Jan Gravningsbraten, Fagersta (SE); Micael Baudin, Fagersta (SE)

(73) Assignee: Seco Tools AB, Fagersta (SE)

( * ) Notice: Subject to any disclaimer, the term of this patent is extended or adjusted under 35 U.S.C. 154(b) by 463 days.

(21) Appl. No.: 17/923,164

(22) PCT Filed: Apr. 23, 2021

(86) PCT No.: PCT/EP2021/060682
§ 371 (c)(1),
(2) Date: Nov. 3, 2022

(87) PCT Pub. No.: WO2021/224031
PCT Pub. Date: Nov. 11, 2021

(65) Prior Publication Data
US 2023/0347464 A1  Nov. 2, 2023

(30) Foreign Application Priority Data
May 6, 2020 (EP) ..................... 20173168

(51) Int. Cl.
*B23Q 17/24* (2006.01)
(52) U.S. Cl.
CPC ...... *B23Q 17/2457* (2013.01); *B23C 2210/66* (2013.01)

(58) Field of Classification Search
CPC ............... B23Q 17/2457; B23Q 17/22; B23C 2210/66; B23C 5/16; Y02P 90/02; Y02P 90/30; G06K 17/00
See application file for complete search history.

(56) References Cited

U.S. PATENT DOCUMENTS 5,257,199 A  10/1993 Tsujino et al.
2005/0107919 A1 * 5/2005 Watanabe .............. B25J 9/1656
700/245

(Continued)

FOREIGN PATENT DOCUMENTS

JP  04331036 A * 11/1992
JP  H04331036 A  11/1992

(Continued)

*Primary Examiner* — Alicia M. Choi
(74) *Attorney, Agent, or Firm* — Corinne R. Gorski (57) ABSTRACT

The disclosure relates to a method, computer program product and system for decreasing the risk of erroneously handling a tool in a machine operation. The system includes a reader device for reading a machine readable code arranged at a tool part and an electronic device having a processing circuitry configured to cause the system to receive desired operation data indicative of a tool part to be used during the machine operation. The method includes the steps of receiving desired operation data indicative of the tool part to be used during the machine operation, detecting the identification marker at the tool part, reading, by the reader device, the machine readable code of the identification marker, identifying the tool part, and determining if the identified tool part corresponds to the tool part according to the desired operation data, the identification marker being a machine readable code associated with the tool part.

11 Claims, 4 Drawing Sheets (56) References Cited

U.S. PATENT DOCUMENTS

| | | | |
|---|---|---|---|
| 2006/0200261 A1* | 9/2006 | Monette | G05B 19/4183 |
| | | | 700/115 |
| 2007/0214673 A1* | 9/2007 | Pfau | B23Q 17/2457 |
| | | | 33/628 |
| 2012/0310397 A1* | 12/2012 | Rataul | G05B 19/4188 |
| | | | 700/95 |
| 2014/0148939 A1 | 5/2014 | Nakano et al. | |
| 2015/0253766 A1* | 9/2015 | Pettersson | G05B 19/41805 |
| | | | 700/168 |
| 2016/0199922 A1* | 7/2016 | Andersson | G05B 19/4015 |
| | | | 700/160 |
| 2020/0391335 A1* | 12/2020 | Zoller | B23Q 17/0919 |
| 2021/0107137 A1* | 4/2021 | Ohige | B25J 9/1669 |

FOREIGN PATENT DOCUMENTS

| | | |
|---|---|---|
| JP | 2003071672 A | 3/2003 |
| JP | 2020015148 A | 1/2020 |

* cited by examiner

SYSTEM, METHOD AND COMPUTER PROGRAM PRODUCT FOR DECREASING THE RISK OF ERRONEOUSLY HANDLING OF A TOOL IN A MACHINE OPERATION

RELATED APPLICATION DATA

This application is a § 371 National Stage Application of PCT International Application No. PCT/EP2021/060682 filed Apr. 23, 2021 with priority to EP 20173168.4 filed May 6, 2020.

TECHNICAL FIELD

The present disclosure relates to a system for decreasing the risk of erroneously handling of a tool in a machine operation, a method for decreasing the risk of erroneously handling of a tool in a machine operation and a computer program product for performing the method.

BACKGROUND ART

Today a plurality of machine operations involve use of tools. It is of importance that the tool to be used in the machine operation is the correct tool and that the tool is used in a correct way in order to decrease a risk of erroneously handling of the tool in the machine operation. In some operations, plural tool parts are used in a certain way to e.g. process a material. Today there is a lot of manual handling of tools in machine operations. Often an operator of a machine needs to select the tool or tool parts to be used in the machine operation and e.g. assembly tool parts in a correct way before the machine operation can start.

One example of machine operations are machines with cutting tools that are used to remove chips from a piece of material during machine operation by the cutting tool. In the example, the machine for cutting may require plural tool parts to be assembled in the correct way before starting the machine operation with the cutting tool parts. In the example, a cutting tool may comprise plural tool parts, e.g. a certain tool holder with one or more certain cutting inserts attached at the tool holder. Further, the cutting inserts may have plural cutting edges, and therefore each cutting insert may need to be arranged at the tool holder in a certain way so that the correct cutting edge is used during the machine operation with the cutting tool.

The operator of such cutting machine therefore needs to verify that e.g. the correct cutting tool and the correct cutting inserts are used, and that the cutting inserts are arranged in a certain way in relation to each other and/or that e.g. the right cutting edge of the cutting insert is used etc. This is often done by visual inspection of the tool parts by the operator of the machine, before the machine operation is started by the operator.

A first drawback of current approaches is that a tool can be erroneously handled in the use of the correct cutting tool and the correct cutting inserts, and in the arrangement of the cutting inserts and/or the use of the right cutting edge of the cutting insert.

A second drawback of current approaches is that even if the operator verifies the tool parts before the machine operation, the human error factor is one factor that can lead to an erroneously handling of a tool in a machine operation.

Therefore, there is a need for alternative approaches for decreasing the risk of erroneously handling of a tool in a machine operation.

SUMMARY

A tool can be erroneously handled in many ways. In the example of a cutting tool, as previously described, an incorrect tool holder may be used, wrong cutting inserts may be assembled at the tool holder, or the right cutting inserts may be assembled at the tool holder but at wrong locations at the tool holder, or the cutting inserts may be assembled in a wrong orientation, etc.

It is an object of some embodiments to solve or mitigate, alleviate, or eliminate at least some of the above or other drawbacks.

According to a first aspect there is provided a system for decreasing the risk of erroneously handling of a tool in a machine operation, the system comprises a reader device for reading a machine readable code, arranged at a tool part, during usage of the tool part in a machine operation by a machine, an electronic device configured to be connected to the reader device. The electronic device having a processing circuitry configured to cause the system to receive, at the electronic device, a desired operation data indicative of a tool part to be used during a machine operation by a machine, detect, by the reader device, an identification marker at a tool part wherein the identification marker is a machine readable code associated with the tool part, read, by the reader device, the machine readable code of the identification marker, identify the tool part by information in the read machine readable code of the identification marker, and determine if the identified tool part associated with the read machine readable code corresponds to the tool part according to the desired operation data.

One advantage with this aspect is that a tool part can, e.g. before machine operation, be identified and verified to be a desired tool part to be used during the machine operation by the machine in order to prevent erroneously handling of a tool in a machine operation. One further advantage with this aspect is that alternative approaches for decreasing the risk of erroneously handling of a tool in a machine operation is provided. One further advantage with this aspect is that the human error factor is decreased.

According to some embodiments the processing circuitry is further configured to cause the system to issue an alarm signal to a machine operator and/or stop signal to the machine, in a determination that the identified tool part associated with the read machine readable code does not correspond to the desired operation data, or in a determination that the tool part can no longer be identified by a machine readable code.

One advantage with this embodiment is that the machine operation can be stopped if the tool part is not a desired tool part, but also if e.g. a desired tool part loosens or if the machine readable code cannot be read for any other reason, in order to prevent erroneously handling of the tool in the machine operation, or erroneously handling of a non-existing tool in the machine operation.

According to some embodiments, the desired operation data further comprises data indicative of a desired location of a first tool part in relation to at least a second tool part during usage of the tool parts in a machine operation.

One advantage with this embodiment is that the operation data can be used to further define the desired usage of the tool part in relation to a location of the tool part.

According to some embodiments, the processing circuitry is further configured to cause the system to detect, by the reader device, a first identification marker at a first tool part and a second identification marker at a second tool part, determine, before and/or during usage of the tool parts in the machine operation, the location of the identified first tool part and the location of the identified second tool part in relation to each other or in relation to other tool parts, determine if the first tool part and the second tool part are arranged at locations according to the desired operation data.

One advantage with this embodiment is that it can be verified that tool parts are arranged at desired locations.

According to some embodiments, the desired operation data further comprises data indicative of a desired orientation of the tool part during the machine operation.

One advantage with this embodiment is that the operation data can be used to further define the desired usage of the tool part in relation to an orientation of the tool part.

According to some embodiments, the processing circuitry is further configured to cause the system to determine, before and/or during usage of the tool part in the machine operation, the orientation of the tool part, and determine if the orientation of the tool part corresponds to an orientation of the tool part according to the desired operation data.

One advantage with this embodiment is that it can be verified that the tool part is arranged in a desired orientation before and/or during usage of the tool part in the machine operation.

According to some embodiments, the reader device is configured to be mounted at the machine so that the machine readable code of the tool part comes in the line of sight of the reader device during usage of the tool part in a machine operation by the machine.

One advantage with this embodiment is that when the reader device is mounted at the machine, the machine readable code of the tool part is positioned in the line of sight in a predefined direction in relation to the machine.

According to a second aspect there is provided a method for decreasing the risk of erroneously handling of a tool in a machine operation, the method comprising the step of receiving, at an electronic device, a desired operation data indicative of a tool part to be used during a machine operation by a machine, the step of detecting, by a reader device, an identification marker at a tool part wherein the identification marker is a machine readable code associated with the tool part. The method further comprising the step of reading, by the reader device, the machine readable code of the identification marker, the step of identifying the tool part by information in the read machine readable code of the identification marker, and the step of determining if the identified tool part associated with the read machine readable code corresponds to the tool part according to the desired operation data.

One advantage with this aspect is that a tool part can, e.g. before machine operation, be identified and verified to be a desired tool part to be used during the machine operation by the machine in order to prevent erroneously handling of a tool in a machine operation. One further advantage with this aspect is that alternative approaches for decreasing the risk of erroneously handling of a tool in a machine operation is provided. One further advantage with this aspect is that the human error factor is decreased.

According to some embodiments, the method further comprises the step of issuing an alarm signal to a machine operator and/or stop signal to the machine, in a determination that the identified tool part associated with the read machine readable code does not correspond to the desired operation data, or in a determination that the tool part can no longer be identified by a machine readable code.

One advantage with this embodiment is that the machine operation can be stopped if the tool part is not a desired tool part, but also if e.g. a desired tool part loosen or if the machine readable code cannot be read for any other reason, in order to prevent erroneously handling of the tool in the machine operation or erroneously handling of a non-existing tool in the machine operation.

According to some embodiments, the desired operation data further comprises data indicative of a desired location of a first tool part in relation to at least a second tool part during usage of the tool parts in a machine operation.

One advantage with this embodiment is that the operation data can be used to further define the desired usage of the tool part in relation to a location of the tool part.

According to some embodiments, the method further comprises the step of detecting, by the reader device, a first identification marker at a first tool part and a second identification marker at a second tool part, the step of determining, before and/or during usage of the tool parts in the machine operation, the location of the identified first tool part and the location of the identified second tool part in relation to each other or in relation to other tool parts, and the step of determining if the first tool part and the second tool part are arranged at locations according to the desired operation data.

One advantage with this embodiment is that it can be verified that tool parts are arranged at desired locations.

According to some embodiments, the desired operation data further comprises data indicative of a desired orientation of the tool part during the machine operation.

One advantage with this embodiment is that the operation data can be used to further define the desired usage of the tool part in relation to an orientation of the tool part.

According to some embodiments, the method further comprises the step of determining, before and/or during usage of the tool parts in a machine operation, the orientation of the identified the tool part, and the step of determining if the orientation of the tool part corresponds to an orientation of the tool part according to the desired operation data.

One advantage with this embodiment is that it can be verified that the tool part is arranged in a desired orientation before and/or during usage of the tool part in the machine operation.

According to some embodiments, the desired operation data is received at the electronic device via at least any of a user interface configured to receive user input of desired operation data corresponding to the tool part by an operator, the reader device configured to read the machine readable code of the tool part, or via data input from the machine configured to provide data of the tool part.

One advantage with this embodiment is that the desired operation data can be received via manual input e.g. by an operator via a user interface, or via machine input by a reader device e.g. operated by an operator, or via input of data from a machine.

According to a third aspect there is provided a computer program product comprising a non-transitory computer readable medium, having thereon a computer program comprising program instructions, the computer program being loadable into a processing circuitry and configured to cause execution of the method when the computer program is run by the processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Example tool parts for use in a machine operation will now be described for illustrative purpose, to visualize and exemplify the prior art and the aspects of the disclosure. It is understood that the aspects of the disclosure can be applied to any tool part for decreasing the risk of erroneously handling of any tool in any machine operation. In the example, and in the following description, tool parts for cutting are disclosed. Example machine operations are related to machines with cutting tools that are used to remove chips from a piece of material during the machine operation.

Figure 1:
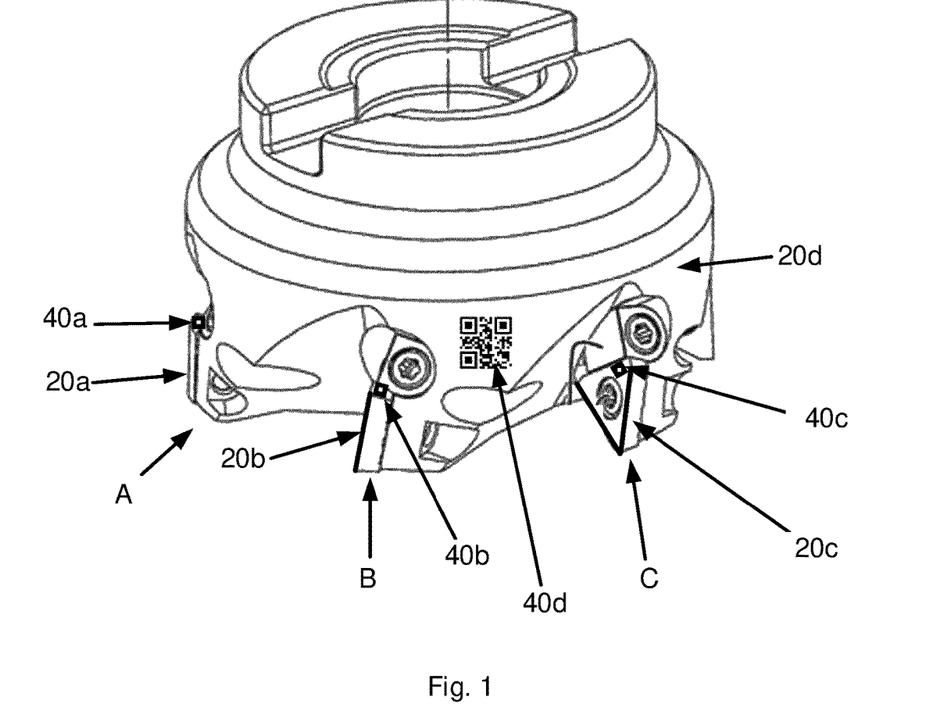
FIG. 1 illustrates example tool parts according to an embodiment of the present disclosure.

FIG. 1 illustrates example tool parts 20a, 20b, 20c, 20d. In the example, as illustrated in FIG. 1, the tool parts 20a, 20b, 20c are cutting inserts and the tool part 20d is a tool holder. In the example the tool holder 20d is arranged to receive the cutting inserts, i.e. the tool parts 20a, 20b, 20c, at locations at the tool holder 20d illustrated as positions "A", "B" and "C" respectively.

Figure 2A:
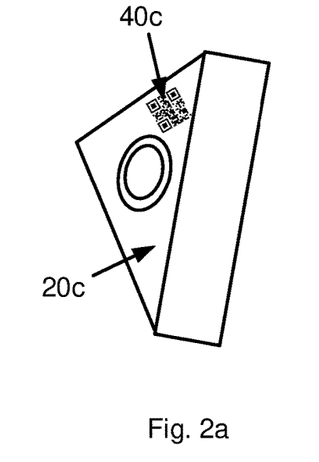
FIGS. 2a-c illustrate an example tool part in form of a cutting insert with plural cutting edges according to an embodiment of the present disclosure.
Figure 2B:
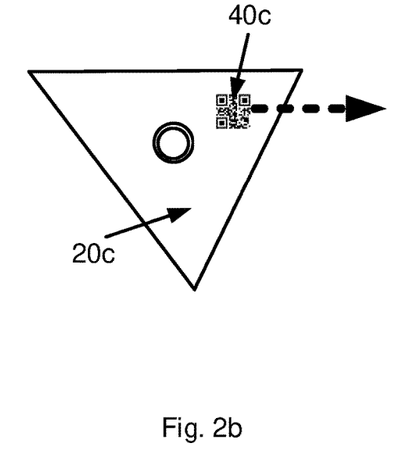
Figure 2C:
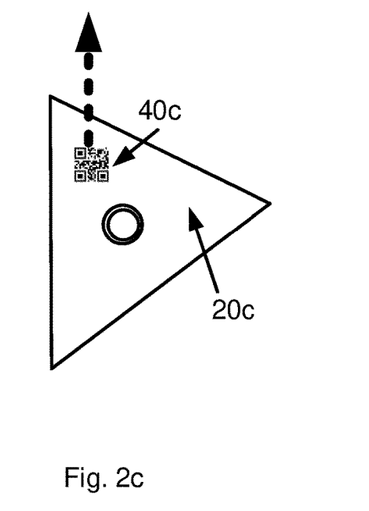

Further, in the example as illustrated in FIG. 1 the cutting inserts, i.e. the tool parts 20a, 20b, 20c, each comprising three cutting edges. FIGS. 2a-c illustrates an example tool part 20c in form of a cutting insert with plural cutting edges. In the example, with reference to FIG. 1 and FIGS. 2a-c, each cutting edge of each cutting insert is configured to be used for removing chips from a piece of material. The orientation of each cutting insert, when assembled with the tool holder 20d, is therefore of interest in order to know which of the cutting edges of each cutting insert that is used for processing during the machine operation.

As mentioned above, today an operator needs to verify that e.g. the correct tool holder and the correct cutting inserts are used, and that the cutting inserts are arranged in a certain way in relation to each other and that e.g. the right cutting edge of the each cutting insert is used, which is dependent on how the cutting insert is orientated when attached to the tool holder. This is often done by visual inspection of the tool parts by an operator, before the machine operation is started.

As mentioned above, a tool can therefore be erroneously handled in many ways. Even if the operator controls the tool parts before the machine operation, the human error factor is one factor that can lead to erroneously handling of a tool in a machine operation. An incorrect tool holder may be used, wrong cutting inserts may be attached to the tool holder, or the right cutting inserts may be attached to the tool holder but at wrong locations at the tool holder, or the cutting inserts may be attached to the tool holder in a wrong orientation, etc.

There is a demand for decreasing the risk of erroneously handling of a tool in a machine operation. The inventors have come up with a solution that reduces the risk of human errors and that can also reduce the time needed for verifying that desired tool parts are used in a correct way. In the following, aspects and embodiments will be presented where alternative approaches for decreasing the risk of erroneously handling of a tool in a machine operation are described.

Figure 3A:
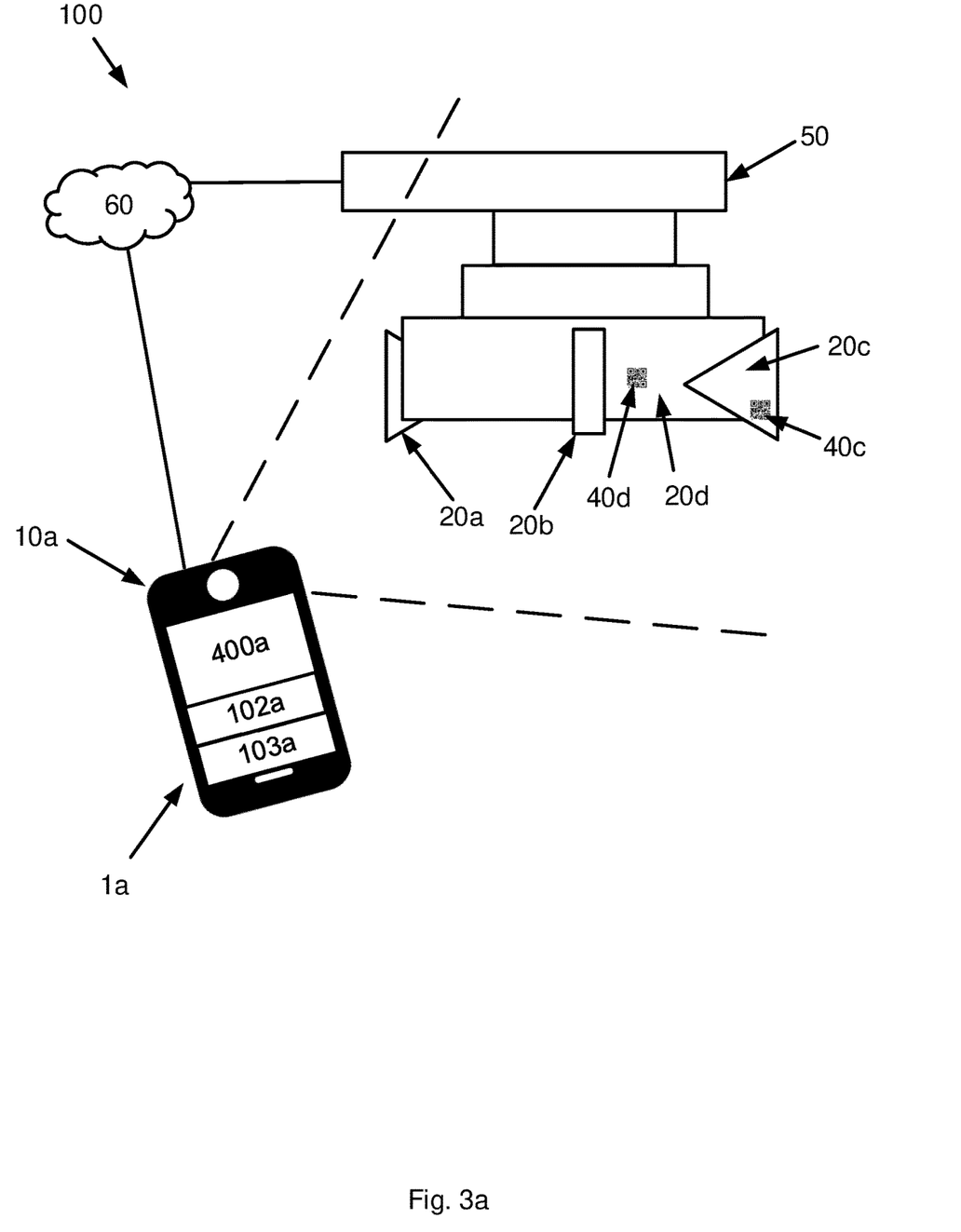
FIG. 3a illustrates an example system according to an embodiment of the present disclosure.
Figure 3B:
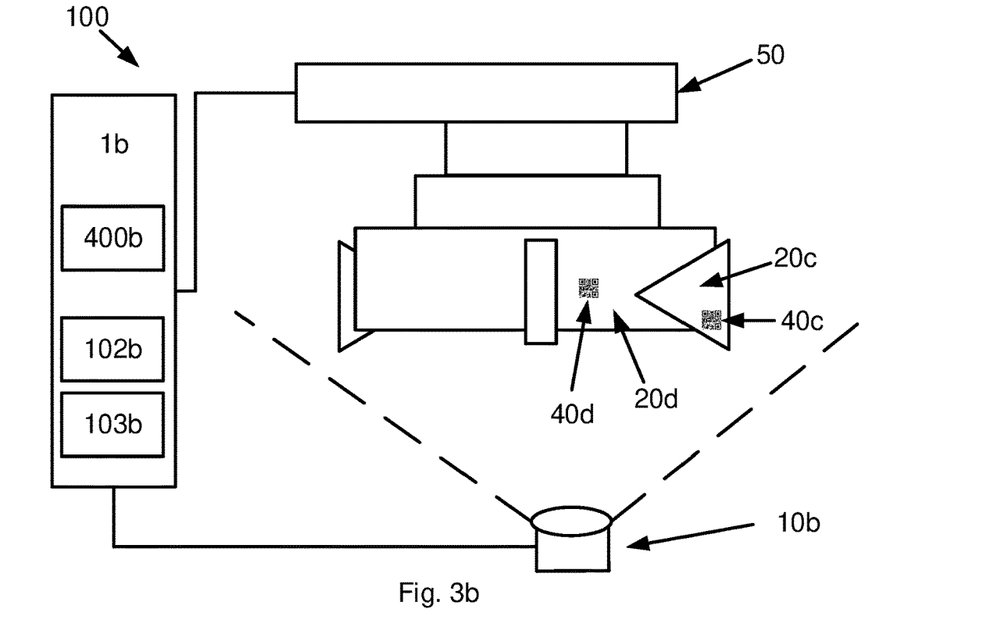
FIG. 3b illustrates an example system according to an embodiment of the present disclosure.
Figure 3C:
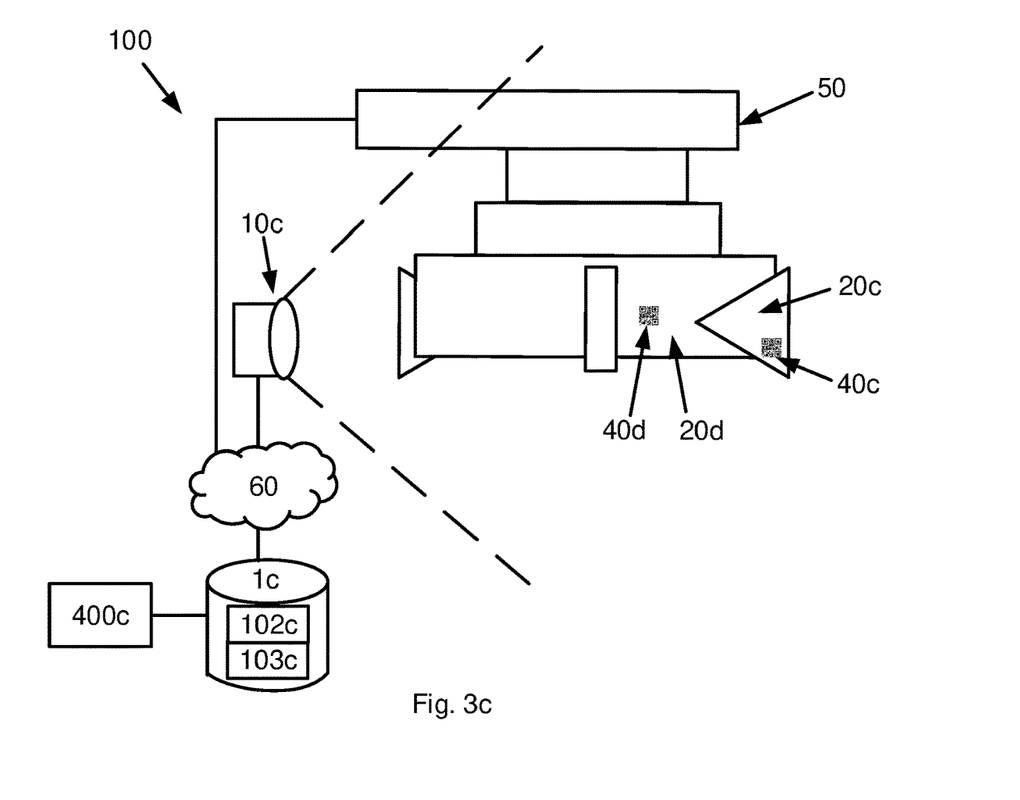
FIG. 3c illustrates an example system according to an embodiment of the present disclosure.

FIGS. 3a-3c illustrates example systems according to some embodiments of the present disclosure.

The first aspect of this disclosure shows a system 100 for decreasing the risk of erroneously handling of a tool in a machine operation. The system 100 comprises a reader device 10a, 10b, 10c for reading a machine readable code. According to some embodiments the reader device 10a, 10b, 10c is any of a camera based reader, a video camera reader, a pen-type reader with photodiodes, a laser scanner, a charge-coupled device reader or a cell phone camera. According to some embodiments the reader device 10a, 10b, 10c is a component integrated in an electronic device or a stand-alone component. The reader device 10a, 10b, 10c is configured for reading a machine readable code, arranged at a tool part 20a, 20b, 20c, 20d, during usage of the tool part 20a, 20b, 20c, 20d in a machine operation by a machine 50. According to some embodiments the tool part 20a, 20b, 20c, 20d is any of a cutting insert, a milling tool part, drilling tool part, a drill chuck, a milling cutter chuck or a tool holder.

The system further comprises an electronic device 1a, 1b, 1c configured to be connected to the reader device 10a, 10b, 10c. According to some embodiments the electronic device is a portable electronic device 1a. According to some embodiments electronic device is a local electronic device 1b. According to some embodiments the electronic device is a remote electronic device 1c. According to some embodiments the electronic device 1a, 1b, 1c is configured to be connected to a communication network 60. FIG. 3a illustrates an electronic device 1a in form of a smartphone, tablet, cellular phone, feature phone or any portable electronic device. In one example, as illustrated in FIG. 3a, the reader device 10a is the camera of a smartphone 1a. The electronic device can also be a local electronic device 1b, e.g. installed as a part of a machine 50 as illustrated in FIG. 3b. In one example, illustrated in FIG. 3b, the reader device 10b is a stand-alone reader device connected to the electronic device 1b and installed as a part of the machine 50. According to some embodiments the electronic device is a remote server 1c connected to a reader device 10c via the communication network 60 as illustrated in FIG. 3c.

The electronic device 1a, 1b, 1c having a processing circuitry 102a, 102b, 102c configured to cause the system 100 to receive, at the electronic device 1a, 1b, 1c, a desired operation data indicative of a tool part 20a, 20b, 20c, 20d to be used during a machine operation by a machine 50.

According to some embodiments the desired operation data is received at the electronic device 1a, 1b, 1c via a user interface 400a, 400b, 400c configured to receive user input of desired operation data corresponding to the tool part 20a, 20b, 20c, 20d by an operator. In an example, a certain machine operation requires certain tool parts 20a, 20b, 20c, 20d and the certain tool parts 20a, 20b, 20c, 20d are identified by e.g. a serial number or identification number that an operator can input together with e.g. certain tool part parameters via the user interface 400a, 400b, 400c.

According to some embodiments the desired operation data is received at the electronic device 1a, 1b, 1c via the reader device 10a, 10b, 10c configured to read the machine readable code of the identification marker 40a, 40b, 40c, 40d of the tool part. In an example, a certain machine operation requires certain tool parts 20a, 20b, 20c, 20d and the certain tool parts 20a, 20b, 20c, 20d are identified and picked up by an operator, and the operator then uses the reader device 10a, 10b, 10c, to input e.g. a serial number or identification number together with certain tool part parameters, by scanning the identification markers 40a, 40b, 40c, 40d of the certain tool parts 20a, 20b, 20c, 20d with the reader device 10a, 10b, 10c.

According to some embodiments the desired operation data is received at the electronic device 1a, 1b, 1c via data input from the machine 50 configured to provide data of the tool part 20a, 20b, 20c, 20d. In an example, a certain machine operation requires certain tool parts 20a, 20b, 20c, 20d and the certain tool parts 20a, 20b, 20c, 20d are identified by the machine 50 and e.g. a serial number or identification number together with certain tool part parameters of the certain tool parts 20a, 20b, 20c, 20d are sent, e.g. via the communication network 60, from the machine 50 and received at the electronic device 1a, 1b, 1c.

The desired operation data can hence be received at the electronic device 1a, 1b, 1c in plural ways. According to some embodiments the electronic device 1a, 1b, 1c further comprising a memory 103a, 103b, 103c. According to some embodiments the desired operation data indicative of a tool part 20a, 20b, 20c, 20d to be used during a machine operation by a machine 50 is stored in the memory 103a, 103b, 103c.

In an example use case, a machine operation is desired to be started and a certain tool, comprising plural tool parts 20a, 20b, 20c, 20d, is assembled before the machine operation to be ready for the machine operation. The desired operation data indicative of the tool parts 20a, 20b, 20c, 20d to be used during the machine operation is stored in the memory 103a, 103b, 103c. The tool parts 20a, 20b, 20c, 20d are arranged together and attached to the machine 50 to be ready for the machine operation.

The processing circuitry 102a, 102b, 102c is further configured to cause the system 100 to detect, by the reader device 10a, 10b, 10c, an identification marker 40a, 40b, 40c, 40d at a tool part 20a, 20b, 20c, 20d wherein the identification marker 40a, 40b, 40c, 40d is a machine readable code associated with the tool part 20a, 20b, 20c, 20d, read, by the reader device 10a, 10b, 10c, the machine readable code of the identification marker 40a, 40b, 40c, 40d, identify the tool part 20a, 20b, 20c, 20d by information in the read machine readable code of the identification marker 40a, 40b, 40c, 40d.

The processing circuitry 102a, 102b, 102c is then further configured to cause the system 100 to determine if the identified tool part 20a, 20b, 20c, 20d associated with the read machine readable code corresponds to the tool part 20a, 20b, 20c, 20d according to the desired operation data.

Hence one advantage with this aspect is that a tool part can, e.g. before machine operation, be identified and verified to be a desired tool part to be used during the machine operation in order to prevent erroneously handling of a tool in a machine operation.

According to some embodiments, the processing circuitry 102a, 102b, 102c is further configured to cause the system 100 to determine if the identified tool part 20a, 20b, 20c, 20d associated with the read machine readable code corresponds to the tool part 20a, 20b, 20c, 20d according to the desired operation data, and in a determination that the identified tool part 20a, 20b, 20c, 20d associated with the read machine readable code does not correspond to the tool part 20a, 20b, 20c, 20d according to the desired operation data, output, via a user interface 400a, 400b, 400c of the electronic device 1a, 1b, 1c, error information data indicative of the tool part 20a, 20b, 20c, 20d that does not correspond to the tool part 20a, 20b, 20c, 20d according to the desired operation data.

According to some embodiments the error information data comprising a graphical representation of the tool part 20a, 20b, 20c, 20d via the user interface 400a, 400b, 400c for illustrating to an operator which tool part 20a, 20b, 20c, 20d that needs to be attend to in order to prevent erroneously handling of a tool in a machine operation. In an example the error information data comprising a color representation of the tool part 20a, 20b, 20c, 20d e.g. the tool part 20a, 20b, 20c, 20d is represented by the color red.

According to some embodiments, the processing circuitry 102a, 102b, 102c is further configured to cause the system 100 to output, via a user interface 400a, 400b, 400c of the electronic device 1a, 1b, 1c, guidance information data indicative of a virtual representation of a desired tool part 20a, 20b, 20c, 20d according to the desired operation data, for guiding an operator to select a correct tool part 20a, 20b, 20c, 20d in order to prevent erroneously handling of a tool in a machine operation.

In an example, the tool parts 20a, 20b, 20c, 20d are slowly rotated by the machine 50 and the reader device 10a, 10b, 10c detects each identification marker 40a, 40b, 40c, 40d at each tool part 20a, 20b, 20c, 20d, and determines if the identified tool part 20a, 20b, 20c, 20d corresponds to the tool part 20a, 20b, 20c, 20d according to the desired operation data. In the example, by rotating the tool parts 20a, 20b, 20c, 20d, all identification markers 40a, 40b, 40c, 40d comes in line of sight of the reader device 10a, 10b, 10c and when all identification markers 40a, 40b, 40c, 40d are read it can be verified if the identified tool parts 20a, 20b, 20c, 20d corresponds to the tool parts 20a, 20b, 20c, 20d according to the desired operation data. If the machine operation pauses, and e.g. the machine is stopped and opened by an operator, this verification procedure by slowly rotating the tool parts 20a, 20b, 20c, 20d before the machine can be run once again to make sure that no tool part has been replaced before continuing the machine operation.

According to some embodiments the system 100 is operatively connectable to a machine 50 for controlling the operation of the machine 50. According to some embodiments the system 100 is operatively connectable to a machine 50 via a communication network 60.

According to some embodiments the communication network 60 is a wireless communication network. According to some embodiments the wireless communication network is a standardized wireless local area network such as a Wireless Local Area Network, WLAN, Bluetooth™, ZigBee, Ultra-Wideband, UWB, Radio Frequency Identification, RFID, or similar network. According to some embodiments the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments the wireless communication network can also be a combination of both a wireless local area network and a wireless wide area network. According to some embodiments communication network 60 can be a combination a wired communication network and a wireless communication network. According to some embodiments the communication network 60 is defined by common Internet Protocols.

In an example, before a machine operation, a verification by the system 100, verifying that the identified tool part 20a, 20b, 20c, 20d associated with the read machine readable code corresponds to the tool part 20a, 20b, 20c, 20d according to the desired operation data, is required before allowing machine operation by the machine 50. In the example an operator of a machine is required to operate the system 100 to initiate a verification process before starting the machine operation. In an example the verification process before machine operation is carried out while the tool part 20a, 20b, 20c, 20d is slowly rotating in the machine but without any processing by the tool part 20a, 20b, 20c, 20d.

According to some embodiments the processing circuitry 102a, 102b, 102c is further configured to cause the system 100 to issue an alarm signal to a machine operator and/or stop signal to the machine 50, in a determination that a tool part 20a, 20b, 20c, 20d has not been identified. In an example, a machine operation cannot occur unless a tool part 20a, 20b, 20c, 20d has been identified.

According to some embodiments the processing circuitry 102a, 102b, 102c is further configured to cause the system 100 to issue an alarm signal to a machine operator and/or stop signal to the machine 50, in a determination that a tool part 20a, 20b, 20c, 20d has been identified but determined to be a tool part 20a, 20b, 20c, 20d that is not desired according to the desired operation data. In an example, a machine operation cannot occur unless the identified tool part 20a, 20b, 20c, 20d associated with the read machine readable code corresponds to the tool part 20a, 20b, 20c, 20d according to the desired operation data.

In an example an operator of the machine 50 can replace the tool part that is not desired and re-run the verification procedure. In an example an operator is informed e.g. via a user interface 400a, 400b, 400c, that e.g. a desired tool part is missing and/or that a wrong, undesirable tool part is present.

According to some embodiments the processing circuitry 102a, 102b, 102c is further configured to cause the system 100 to issue an alarm signal to a machine operator and/or stop signal to the machine 50, in a determination that the identified tool part 20a, 20b, 20c, 20d associated with the read machine readable code does not correspond to the desired operation data, or in a determination that the tool part 20a, 20b, 20c, 20d can no longer be identified by a machine readable code.

According to some embodiments the alarm signal to the machine operator is any of an audio output signal, a visual output signal or an audiovisual output signal via the user interface 400a, 400b, 400c of the electronic device 1a, 1b, 1c. According to some embodiments the stop signal to the machine 50 is a data signal indicative of a stop command to be received at the machine 50 for stopping the machine operation.

Hence one advantage with this embodiment is that the machine operation can be stopped if the tool part 20a, 20b, 20c, 20d is not a desired tool part, but also if e.g. a desired tool part loosen or if the machine readable code cannot be read for any other reason, in order to prevent erroneously handling of a tool 20a, 20b, 20c, 20d in a machine operation or erroneously handling of a non-existing tool 20a, 20b, 20c, 20d in the machine operation. A tool part 20a, 20b, 20c, 20d loosening during machine operation can cause severe damages to the machine 50 and to the processed material.

According to some embodiments the desired operation data further comprises data indicative of a desired location of a first tool part 20a in relation to at least a second tool part 20b, 20c, 20d during usage of the tool parts 20a, 20b, 20c, 20d in a machine operation.

According to some embodiments the desired location of a first tool part 20a in relation to at least a second tool part 20b, 20c, 20d comprising a certain order of the first tool part 20a in relation to at least a second tool part 20b, 20c, 20d. According to some embodiments the order of the first tool part 20a in relation to the at least a second tool part 20b, 20c, 20d is defined by a rotation direction of the tool parts 20a, 20b, 20c, 20d.

In an example the first tool part 20a must come before the at least a second tool part 20b, 20c, 20d during machine operation for processing by the first tool part 20a and the at least a second tool part 20b, 20c, 20d in a certain way. According to some embodiments plural tool parts 20a, 20b, 20c, 20d are desired to be arranged in a certain order. In the example as illustrated in FIG. 1 the first tool part 20a, is arranged in order before the second tool part 20b, and the second tool part 20b, is arranged before the third tool part 20c. In this example the tool parts 20a, 20b and 20c are cutting inserts arranged at a tool holder 20d and in the example the tool parts 20a, 20b, 20c, are arranged at desired locations in relation to each other at the tool holder 20d. In the example in FIG. 1 the tool holder 20d is configured to rotate a certain direction and the order of the first tool part 20a in relation to at least a second tool part 20b, 20c, 20d is defined by the rotation of the tool holder 20d.

According to some embodiments the order of the first tool part 20a in relation to the at least a second tool part 20b, 20c is defined by predefined alternative placement locations of the first and at least second tool parts 20a, 20b, 20c at a third tool part 20d. In the example as illustrated in FIG. 1, the third tool part 20d is a tool holder with predefined alternative placement locations for the first and at least second tool parts 20a, 20b, 20c. In the example as illustrated in FIG. 1 the predefined alternative placement locations of the first and at least second tool parts 20a, 20b, 20c at a third tool part 20d is illustrated by the locations "A", B" and "C". In an example the desired operation data comprises data indicative of a desired location of a first tool part 20a, a cutting insert, at a third tool part 20d, a tool holder.

Hence, one advantage with this embodiment is that the operation data can be used to further define the desired usage of the tool part in relation to a location of the tool part.

According to some embodiments the processing circuitry 102a, 102b, 102c is further configured to cause the system 100 to detect, by the reader device 10a, 10b, 10c, a first identification marker 40a at a first tool part 20a and a second identification marker 40b at a second tool part 20b, determine, before and/or during usage of the tool parts 20a, 20b, 20c, 20d in the machine operation, the location of the identified first tool part 20a and the location of the identified second tool part 20b in relation to each other or in relation to other tool parts 20c, 20d, determine if the first tool part 20a and the second tool part 20b are arranged at locations according to the desired operation data.

According to some embodiments the determination if the first tool part 20a and the second tool part 20b are arranged at locations according to the desired operation data is done before usage of the tool parts 20a, 20b, 20c, 20d in the machine operation to verify that the tool parts 20a, 20b, 20c, 20d are correctly arranged in order to prevent erroneously handling of a tool in a machine operation.

Hence, one advantage with this embodiment is that it can be verified that tool parts are arranged at desired locations in relation to each other.

According to some embodiments the determination if the first tool part 20a and the second tool part 20b are arranged at locations according to the desired operation data is done continuously during usage of the tool parts 20a, 20b, 20c, 20d in the machine operation to verify that the tool parts 20a, 20b, 20c, 20d are maintained in place to determine if any tool part 20a, 20b, 20c, 20d is lost during machine operation in order to prevent erroneously handling of a tool in a machine operation.

Hence, one advantage with this embodiment is that it can be verified that tool parts are maintained at desired locations in relation to each other.

According to some embodiments the desired operation data further comprises data indicative of a desired orientation of the tool part 20a, 20b, 20c, 20d during the machine operation.

In the example as illustrated in FIG. 1, the tool parts 20a, 20b, 20c are cutting inserts. FIGS. 2a-c illustrates an example tool part 20c in form of a cutting insert with plural cutting edges. In an example, with reference to FIG. 1 and FIGS. 2a-c, each cutting edge of each cutting insert is configured to be used for removing chips from a piece of material. The orientation of each cutting insert, when assembled with the tool holder 20d, as illustrated in the example in FIG. 1, is therefore of interest in order to know which of the cutting edges of each cutting insert that is used for removing chips from the piece of material during the machine operation.

According to some embodiments the identification marker 40a, 40b, 40c, 40d at the tool part 20a, 20b, 20c, 20d is a machine readable code that further comprises an orientation detection pattern for determining a relative direction of the tool part 20a, 20b, 20c, 20d. According to some embodiments the identification marker 40a, 40b, 40c, 40d is arranged at the tool part 20a, 20b, 20c, 20d in a predefined direction for determining a direction of the tool part 20a, 20b, 20c, 20d in relation to the identification marker 40a, 40b, 40c, 40d at the tool part 20a, 20b, 20c, 20d.

According to some embodiments a plurality of identification markers 40a, 40b, 40c, 40d are arranged at predefined positions on the tool part 20a, 20b, 20c, 20d. The orientation of the tool part 20a, 20b, 20c, 20d is determined based on which of the plurality of identification markers 40a, 40b, 40c, 40d that can be read by the reader device 10a, 10b, 10c.

According to some embodiments the desired operation data further comprises data indicative of a desired orientation of the desired tool part 20a, 20b, 20c, 20d.

According to some embodiments the orientation detection pattern is detected and read by the reader device 10a, 10b, 10c to identify the relative direction of the tool part 20a, 20b, 20c, 20d in relation to the reader device 10a, 10b, 10c. According to some embodiments the reader device 10a, 10b, 10c is arranged in a predetermined direction in relation to the machine 50 to determine the relative direction of the tool part 20a, 20b, 20c, 20d in relation to the machine 50.

According to some embodiments the electronic device 1a comprises the reader device 10a. According to some embodiments the electronic device 1a comprises an orientation detection unit configured to determine the orientation of the electronic device 1a and the reader device 10a. According to some embodiments the orientation detection unit is at least one of a gyroscope or an accelerometer. According to some embodiments the orientation of the tool part 20a, 20b, 20c, 20d is determined in relation to a normal plane that is common with a normal plane of the electronic device 1a. According to some embodiments the orientation of the tool part 20a, 20b, 20c, 20d is determined in relation to a normal plane that is common with a normal plane of the machine 50. According to some embodiments the orientation of the tool part 20a, 20b, 20c, 20d is defined by a certain number of degrees in relation to a predefined plane.

In an example the orientation of the tool part 20a, 20b, 20c, 20d can be determined to understand which part of the tool part 20a, 20b, 20c, 20d that is used for processing of a material during machine operation.

FIGS. 2b and 2c illustrates an example tool part 20c, a cutting insert, wherein the identification marker 40c at the tool part 20c is a machine readable code that further comprises an orientation detection pattern for determining a relative direction of the tool part 20c. In the example in FIG. 2b a reader device determines an orientation of the tool part 20c that is parallel, 0 degrees, to the normal place of the reader device. In the example, with reference to FIG. 2c, the reader device determines an orientation of the tool part 20c that is perpendicular, 90 degrees, to the normal plane of the reader device. According to some embodiments it can be determined which side of the tool part 20c that will be used during machine operation. In the example as illustrated in FIG. 1, by the orientation detection pattern of the tool part 20c, the cutting insert, it can be determined which side of the tool part 20c, e.g. which cutting edge of the cutting insert, that will be used for processing of the material during machine operation.

According to some embodiments the desired operation data further comprises data indicative of a desired orientation of a first tool part in relation to the orientation of a second tool part. In an example, as illustrated in FIG. 1, the tool parts 20a, 20b, 20c are cutting inserts and the tool part 20d is a tool holder. In the example the tool holder 20d is arranged to receive the cutting inserts, i.e. the tool parts 20a, 20b, 20c, at locations at the tool holder 20d illustrated as positions "A", "B" and "C" respectively and each cutting insert can be orientated in three different ways when assembled onto the tool holder 20d. In the example as illustrated in FIG. 1, the tool holder 20d is a first tool part arranged in a first direction and e.g. the cutting insert 20c is a second tool part arranged in a second direction. The identification marker 40d at the tool holder 20d, the first tool part, is arranged in a predefined direction, and the identification marker 40c at the cutting insert 20c, the second tool part, is arranged in a predefined direction. The identification marker 40d at the tool holder 20d is detected and read by the reader device 10a, 10b, 10c to identify the direction of the tool holder 20d. The identification marker 40c at the cutting insert 20c is detected and read by the reader device 10a, 10b, 10c to identify the direction of the cutting insert 20c. The direction of the cutting insert 20 in relation to the direction of the tool holder 20d can hence be determined. Accordingly, it can be determined if the desired orientation of a first tool part in relation to the orientation of a second tool part is according to the desired operation data.

According to some embodiments orientation information data comprising a graphical representation of the orientation of the tool part 20a, 20b, 20c, 20d is outputted via the user interface 400a, 400b, 400c. In an example the orientation information data comprising an angle representation of the tool part 20a, 20b, 20c, 20d. In an example the orientation information data comprising a color representation of a tool part 20a, 20b, 20c, 20d being erroneously orientated.

According to some embodiments, the processing circuitry 102a, 102b, 102c is further configured to cause the system 100 to output, via a user interface 400a, 400b, 400c of the electronic device 1a, 1b, 1c, guidance information data indicative of a desired orientation of a tool part 20a, 20b, 20c, 20d for guiding an operator to select a desired orientation of the tool part 20a, 20b, 20c, 20d in order to prevent erroneously handling of a tool in a machine operation.

According to some embodiments the processing circuitry 102a, 102b, 102c is further configured to cause the system 100 to determine, before and/or during usage of the tool part 20a, 20b, 20c, 20d in the machine operation, the orientation of the tool part 20a, 20b, 20c, 20d, and determine if the orientation of the tool part 20a, 20b, 20c, 20d corresponds to an orientation of the tool part according to the desired operation data.

Hence, one advantage with this embodiment is that it can be verified that the tool part is arranged in a desired orientation before and/or during usage of the tool part in the machine operation.

According to some embodiments the determination of the orientation of the tool part 20a, 20b, 20c, 20d corresponds to an orientation of the tool part according to the desired operation data, is done continuously during usage of the tool part 20a, 20b, 20c, 20d in the machine operation to verify that the tool part 20a, 20b, 20c, 20d is maintained at the desired orientation during the machine operation in order to prevent erroneously handling of a tool in the machine operation.

According to some embodiments, the reader device 10a, 10b, 10c is configured to be mounted at the machine 50 so that the machine readable code of the tool part 20a, 20b, 20c, 20d comes in the line of sight of the reader device 10a, 10b, 10c during usage of the tool part 20a, 20b, 20c, 20d in a machine operation by the machine 50. According to some embodiments, the reader device 10a, 10b, 10c is stationary arranged in a predefined relation to the machine 50 so that the machine readable code of the tool part 20a, 20b, 20c, 20d comes in the line of sight of the reader device 10a, 10b, 10c and so that any of the desired location of a first tool part 20a in relation to at least a second tool part 20b, 20c, 20d, or the desired orientation of the tool part 20a, 20b, 20c, 20d in a machine operation can be determined during usage of the tool part 20a, 20b, 20c, 20d in the machine operation by the machine 50.

Hence, one advantage with this embodiment is that when the reader device 10a, 10b, 10c is mounted at the machine 50, the machine readable code of the tool part 20a, 20b, 20c, 20d comes in the line of sight in a predefined direction in relation to the machine 50. In the example as illustrated in the FIGS. 3b and 3c the reader device 10a, 10b, 10c is mounted at the machine 50 or arranged in a predefined orientation in relation to the machine 50.

Figure 4:
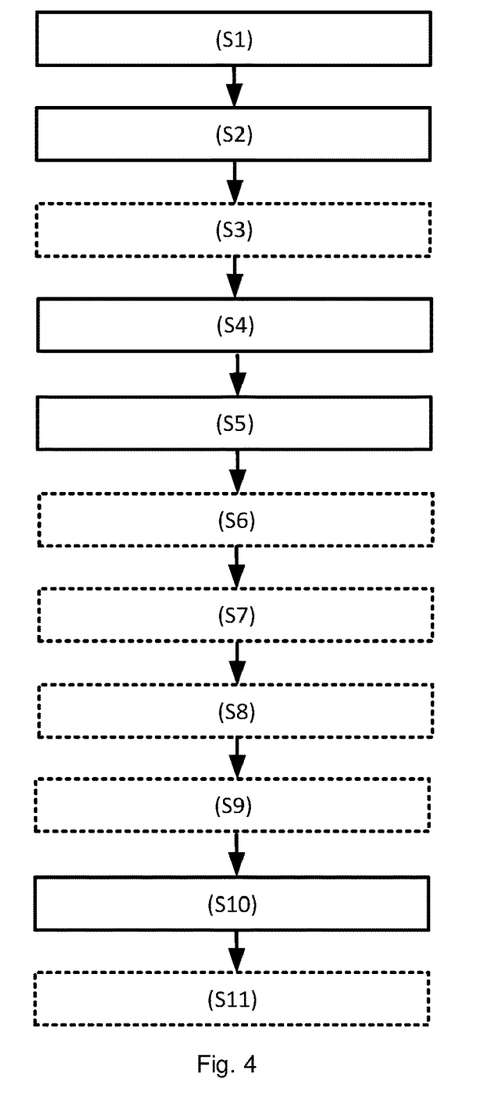
FIG. 4 illustrates a flow chart of example method steps according to the second aspect of the disclosure.

The second aspect of this disclosure shows a method for decreasing the risk of erroneously handling of a tool in a machine operation. FIG. 4 illustrates a flow chart of the method steps according to the second aspect of the disclosure.

The method comprising the step of S1 receiving, at an electronic device 1a, 1b, 1c, a desired operation data indicative of a tool part 20a, 20b, 20c, 20d to be used during a machine operation by a machine 50, the step of S2 detecting, by a reader device 10a, 10b, 10c, an identification marker 40a, 40b, 40c, 40d at a tool part 20a, 20b, 20c, 20d wherein the identification marker 40a, 40b, 40c, 40d is a machine readable code associated with the tool part 20a, 20b, 20c, 20d. The method further comprising the step of S4 reading, by the reader device 10a, 10b, 10c, the machine readable code of the identification marker 40a, 40b, 40c, 40d, the step of S5 identifying the tool part 20a, 20b, 20c, 20d by information in the read machine readable code of the identification marker 40a, 40b, 40c, 40d, and the step of S10 determining if the identified tool part 20a, 20b, 20c, 20d associated with the read machine readable code corresponds to the tool part 20a, 20b, 20c, 20d according to the desired operation data.

Hence, one advantage with this aspect is that a tool part can, e.g. before machine operation, be identified by the machine readable code and verified to be a desired tool part to be used during the machine operation by the machine in order to prevent erroneously handling of a tool in a machine operation.

According to some embodiments the method further comprises the step of 511 issuing an alarm signal to a machine operator and/or stop signal to the machine 50, in a determination that the identified tool part 20a, 20b, 20c, 20d associated with the read machine readable code does not correspond to the desired operation data; or in a determination that the tool part 20a, 20b, 20c, 20d can no longer be identified by a machine readable code.

Hence, one advantage with this embodiment is that it can be verified that tool parts are arranged at desired locations in relation to each other.

According to some embodiments the desired operation data further comprises data indicative of a desired location of a first tool part 20a in relation to at least a second tool part 20b, 20c, 20d during usage of the tool parts 20a, 20b, 20c, 20d in a machine operation.

Hence, one advantage with this embodiment is that the operation data can be used to further define the desired usage of the tool part in relation to an orientation of the tool part.

According to some embodiments method further comprises the step of S3 detecting, by the reader device 10a, 10b, 10c, a first identification marker 40a at a first tool part 20a and a second identification marker 40b at a second tool part 20b, the step of S6 determining, before and/or during usage of the tool parts 20a, 20b, 20c, 20d in the machine operation, the location of the identified first tool part 20a and the location of the identified second tool part 20b in relation to each other or in relation to other tool parts 20c, 20d, and the step of S7 determining if the first tool part 20a and the second tool part 20b are arranged at locations according to the desired operation data.

Hence, one advantage with this embodiment is that it can be verified that the tool part is arranged in a desired orientation before and/or during usage of the tool part in the machine operation.

According to some embodiments the desired operation data further comprises data indicative of a desired orientation of the tool part 20a, 20b, 20c, 20d during the machine operation.

Hence, one advantage with this embodiment is that the operation data can be used to further define the desired usage of the tool part in relation to an orientation of the tool part.

According to some embodiments the method further comprises the step of S8 determining, before and/or during usage of the tool parts 20a, 20b, 20c, 20d in a machine operation, the orientation of the identified tool part 20a, 20b, 20c, 20d, and the step of S9 determining if the orientation of the tool part 20a, 20b, 20c, 20d corresponds to an orientation of the tool part according to the desired operation data.

Hence, one advantage with this embodiment is that it can be verified that the tool part is arranged in a desired orientation before and/or during usage of the tool part in the machine operation.

According to some embodiments the desired operation data is received at the electronic device 1a, 1b, 1c via at least any of a user interface 400a, 400b, 400c configured to receive user input of desired operation data corresponding to the tool part 20a, 20b, 20c, 20d by an operator; the reader device 10a, 10b, 10c configured to read the machine readable code of the tool part 20a, 20b, 20c, 20d; or via data input from the machine 50 configured to provide data of the tool part 20a, 20b, 20c, 20d.

Hence, one advantage with this embodiment is that the desired operation data can be received via manual input e.g. by an operator via a user interface 400a, 400b, 400c, or via machine input by a reader device 10a, 10b, 10c e.g. operated by an operator, or via input of data from a machine 50.

Figure 5:
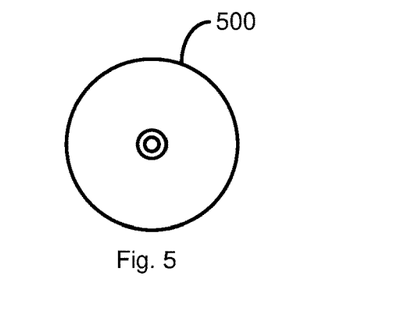
FIG. 5 illustrates an example computer program product according to the third aspect of the disclosure.

FIG. 5 illustrates a computer program product comprising a non-transitory computer readable medium, having thereon a computer program comprising program instructions, the computer program being loadable into a processing circuitry 102a, 102b, 102c and configured to cause execution of the method steps as described in FIG. 4 when the computer program is run by the processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A system for decreasing the risk of erroneously handling of a tool in a machine operation, wherein the tool includes a first tool part and a second tool part, wherein the system comprising:

a reader device for reading machine readable codes arranged at the first and second tool parts during usage of the tool parts in a machine operation by a machine;

an electronic device configured to be connected to the reader device, the electronic device having a processing circuitry configured to cause the system to:

receive, at the electronic device, desired operation data indicative of the first and second tool parts to be used during the machine operation by the machine, wherein the desired operation data includes data indicative of a desired location of the first tool part in relation to the second tool part during usage of the tool parts in the machine operation;

detect, by the reader device, a first identification marker at the first tool part and a second identification marker at the second tool part;

read, by the reader device, the machine readable codes of the first and second identification marker markers;

identify the first and second tool parts by information in the read machine readable codes of the first and second identification markers;

determine if the identified first and second tool part parts associated with the read machine readable codes correspond to the first and second tool part parts according to the desired operation data;

determine, before and/or during usage of the first and second tool parts in the machine operation, a location of the identified first tool part and a location of the identified second tool part in relation to each other or in relation to other tool parts;

determine if the first tool part and the second tool part are arranged at locations according to the desired operation data;

issue a stop signal indicative of a stop command to the machine, upon a determination that the identified first and second tool parts associated with the read machine readable codes do not correspond to the desired operation data; or at least one of the first and second tool parts can no longer be identified by the machine readable codes; and stop the machine operation based on the issued stop signal.

2. The system according to claim 1, wherein the processing circuitry is further configured to cause the system to issue an alarm signal to a machine operator, upon a determination that:

the identified first and second tool parts associated with the read machine readable codes do not correspond to the desired operation data; or at least one of the first and second tool parts can no longer be identified by the machine readable codes.

3. The system according to claim 1, wherein the desired operation data includes data indicative of a desired orientation of the first and second tool parts during the machine operation.

4. The system according to claim 3, wherein the processing circuitry is further configured to cause the system to:

determine, before and/or during usage of the first and second tool parts in the machine operation, an orientation of the first and second tool parts; and determine if the orientation of the first and second tool parts corresponds to an orientation of the first and second tool parts according to the desired operation data.

5. The system according to claim 1, wherein the reader device is configured to be mounted at the machine so that the machine readable code of the first and second tool parts are in a line of sight of the reader device during usage of the first and second tool parts in the machine operation by the machine.

6. A method for decreasing a risk of erroneously handling a tool in a machine operation, wherein the tool includes a first tool part and a second tool part, the method comprising:
receiving, at an electronic device, desired operation data indicative of the first and second tool parts to be used during a machine operation by a machine, wherein the desired operation data includes data indicative of a desired location of the first tool part in relation to the second tool part during usage of the tool parts in the machine operation;
detecting, by a reader device, a first identification marker at the first tool part and a second identification marker at the second tool part;
reading, by the reader device, the machine readable codes of the first and second identification markers;
identifying the first and second tool parts by information in the read machine readable codes of the first and second identification markers;
determining if the identified first and second tool parts associated with the read machine readable codes correspond to the tool part according to the desired operation data;
determining, before and/or during usage of the first and second tool parts in the machine operation, a location of the identified first tool part and a location of the identified second tool part in relation to each other or in relation to other tool parts;
determining if the first tool part and the second tool part are arranged at locations according to the desired operation data;
issuing a stop signal indicative of a stop command to the machine, upon a determination that the identified first and second tool parts associated with the read machine readable codes do not correspond to the desired operation data; or at least one of the first and second tool parts can no longer be identified by the machine readable codes; and
stopping the machine operation based on the issued stop signal.

7. The method according to claim 6, further comprising:
issuing an alarm signal to a machine operator, upon a determination that:
the identified first and second tool parts associated with the read machine readable codes do not correspond to the desired operation data; or
in a determination that the first and second tool parts can no longer be identified by the machine readable codes.

8. The method according to claim 6, wherein the desired operation data includes data indicative of a desired orientation of the first and second tool parts during the machine operation.

9. The method according to claim 8, further comprising:
determining, before and/or during usage of the first and second tool parts in the machine operation, an orientation of the identified first and second tool parts; and
determining if an orientation of the tool part corresponds to an orientation of the first and second tool parts according to the desired operation data.

10. The method according to claim 6, wherein the desired operation data is received at the electronic device via at least any of:
a user interface configured to receive user input of desired operation data corresponding to the first and second tool parts by an operator;
the reader device configured to read machine readable code of the first and second identification markers of the first and second tool parts; or
via data input from the machine configured to provide data of the first and second tool parts.

11. A computer program product comprising a non-transitory computer readable medium, having thereon a computer program including program instructions, the computer program being loadable into a processing circuitry and configured to cause execution of the method according to claim 6, when the computer program is run by the processing circuitry.

* * * * *